United States Patent [19]

Wilke

[11] 4,393,862
[45] Jul. 19, 1983

[54] SOLAR AIR DUCT

[75] Inventor: Douglas A. Wilke, Glen Head, N.Y.

[73] Assignee: The United States of America as represented by the Secretary of Agriculture, Washington, D.C.

[21] Appl. No.: 193,581

[22] Filed: Oct. 14, 1980

[51] Int. Cl.³ .............................................. F24J 3/02
[52] U.S. Cl. .................................. 126/448; 126/445; 126/450; 165/76
[58] Field of Search .............. 126/450, 448, 444, 429, 126/431, 445; 165/181, 170, 76, 166; 138/38; 285/127

[56]  References Cited
U.S. PATENT DOCUMENTS

| 1,028,579 | 6/1912 | Lutz | 285/127 |
|---|---|---|---|
| 2,359,288 | 10/1944 | Brinen | 138/38 |
| 3,769,959 | 11/1973 | Parker | 138/38 |
| 3,863,621 | 2/1975 | Schoenfelder | 126/429 |
| 4,040,476 | 8/1977 | Telle et al. | 165/76 |
| 4,082,082 | 4/1978 | Harvey | 126/448 |
| 4,099,338 | 7/1978 | Mullin et al. | 126/428 |
| 4,271,821 | 6/1981 | Kerr | 126/450 |

FOREIGN PATENT DOCUMENTS 265845  2/1927  United Kingdom ................ 165/170

Primary Examiner—Samuel Scott
Assistant Examiner—Carl Price
Attorney, Agent, or Firm—M. Howard Silverstein; David G. McConnell

[57]  ABSTRACT

A ready-to-assemble kit for a solar air heater is provided including a heating chamber composed of a set of side-by-side elongated, hollow, straight ducts having openings at opposite ends thereof; wherein a manifold is placed at each end of the set, wherein each manifold is composed of an open-topped compartment and overlying lid, wherein the open-topped compartment includes a protruding lip adjacent the top, wherein the lip and overlying lid define an opening therebetween through which the set of ducts horizontally extend into the manifold. In the assembled kit, the heater and manifolds are disposed below a framed-in glazing which transmits solar energy to the heater.

2 Claims, 8 Drawing Figures

SOLAR AIR DUCT

BACKGROUND (1) Field of Invention

This invention relates to solar heated dwellings wherein air is heated by the sun as it passes beneath a glazing, and is thereafter employed to heat the dwelling.

(2) Description of the Prior Art

During the past several years there has been considerable activity in the art of solar house heating. A wide variety of systems have been developed including systems for directly heating air in a solar collector, and blowing such heated air into the rooms of the house, or storing such heat in an energy collector (e.g., a bed of rocks) for later use in the house. The main problem with all of such systems is one of cost. For this reason, the public has been hesitant to incorporate these mechanisms into existing homes or to include same in the building of new homes.

In my copending patent application Ser. No. 118,904, filed Feb. 6, 1980, is described a comparatively inexpensive apparatus which can be readily assembled by the do-it-yourselfer, and which utilizes the above-described prior art technique of heating air directly beneath a piece of glazing. The kit includes:

a. a prefabricated, integral heating chamber to be placed upon a planar-shaped base, which chamber is essentially closed on its roof and along two parallel sides, which chamber is substantially closed on its floor, wherein the chamber includes a protruding segment extending downward from its floor, wherein the protruding segment is of sufficient length to extend through a hole in the base when the kit is assembled;

b. a plurality of guide strips to be attached to the top of the base, wherein the strips surround the perimeter of the chamber when the kit is assembled; and c. a set of elongated glazing supports to be attached to the top of the base; wherein each of the supports lie parallel to and cover one of the guide strips when attached to the top of the base; wherein each support includes a slot along the length of its bottom; wherein the slot is deep enough and just wide enough to fit over and engage the sides of one of the strips; and wherein the supports provide a glazing frame when attached to the top of the base.

SUMMARY

The present invention pertains to an improved heating chamber which may be employed in a kit of the type described in my copending application Ser. No. 118,904, U.S. Pat. No. 4,284,070. More particularly, the chamber comprises a prefabricated set of elongated, hollow, straight ducts, wherein such ducts lie flat, side-by-side, above the kit's base member (e.g., a sheet of plywood) when the kit is assembled and wherein each duct is closed except for duct openings at each end thereof.

In addition to the heating chamber, separate and distinct air manifolds are provided to vertically extend from above the base member down through holes in the base member adjacent the ends of the ducts. There are apertures in the upper sides of the manifolds; and the ducts horizontally extend into the manifolds through such apertures when the kit is assembled.

It is therefore an object of the present invention to provide a readily assembled solar heating kit, wherein the heating chamber may be fabricated by local sheet metal shops, and thereafter easily put in place by the do-it-yourselfer.

Another object is to provide a manifold structure for the heating chamber which also is readily fabricated in local shops, and thereafter easily put in place by the do-it-yourselfer.

DESCRIPTION OF PREFERRED EMBODIMENTS

Figure 1:
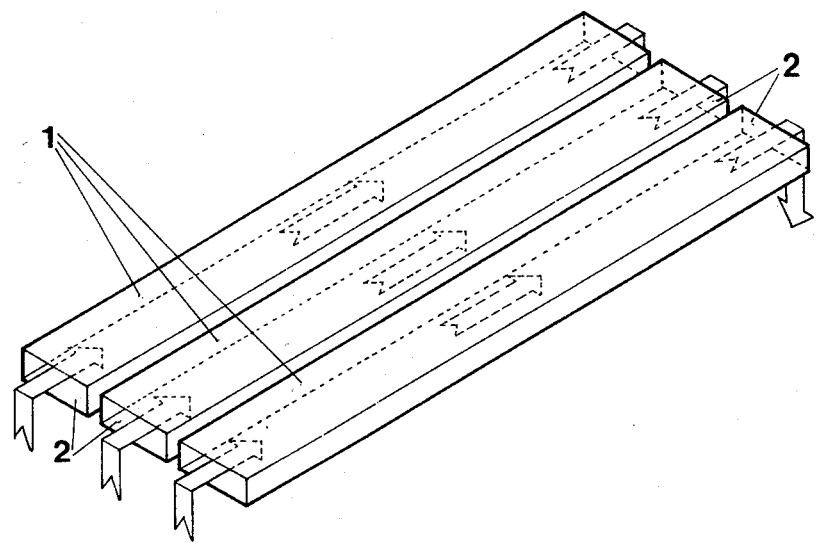
FIG. 1 is a perspective view of the heating chamber of the present invention.

Referring to FIG. 1, reference numeral 1 designates each one of a set of side-by-side, elongated, straight, hollow ducts which, together, make up the heating chamber of the present invention. Each duct, which is essentially free of external protuberances, has an opening 2 at both ends.

Figure 2:
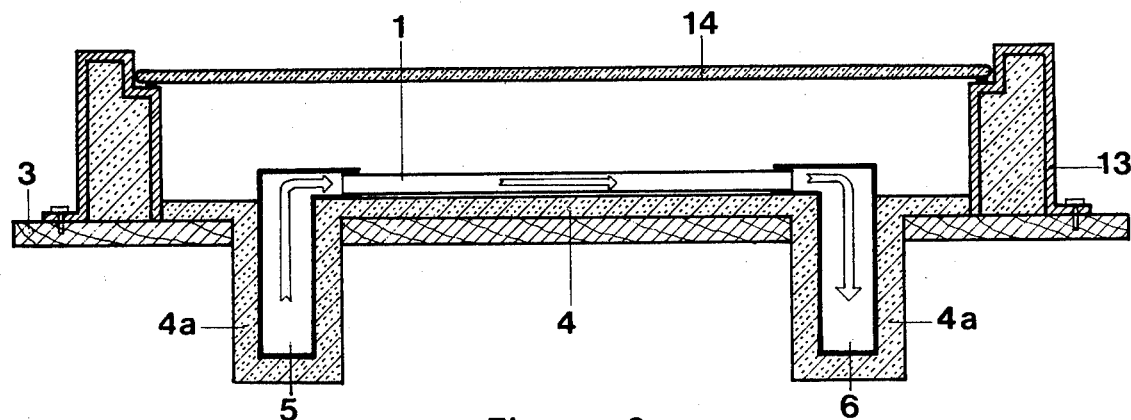
FIG. 2 is a cross-sectional view of the heating chamber in combination with other components of the kit.

As viewed in FIG. 2, when the kit is assembled, each duct lies in a flat position above planar-shaped base member 3 which may be fabricated from 4'×8' sheets of ¾-inch exterior plywood nailed to a wooden framework in the prior art manner, e.g., standard roof construction. A piece of insulation 4, e.g., isocyanurate, may be sandwiched between the heating chamber and the base. The insulation preferably is rigid and about 1 inch in thickness.

First and second air manifold chambers 5 and 6, which are separate and distinct pieces from the heating chamber, are provided adjacent the ends of the ducts. The ducts extend into each manifold through an aperture in one of the manifold's upper sides. As shown by the arrows, air enters the ducts from first manifold 5 and exits via second manifold 6.

Figure 3:
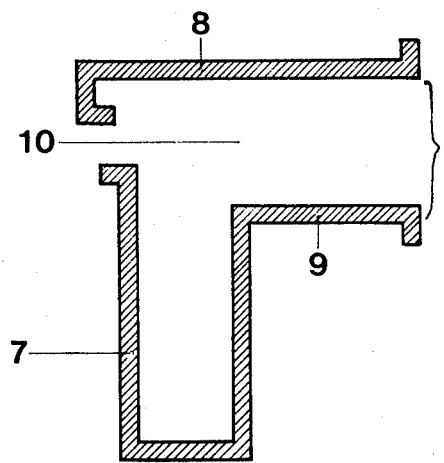
FIGS. 3 and 4 are cross-sectional views of details of the manifolds of FIG. 2.
Figure 4:
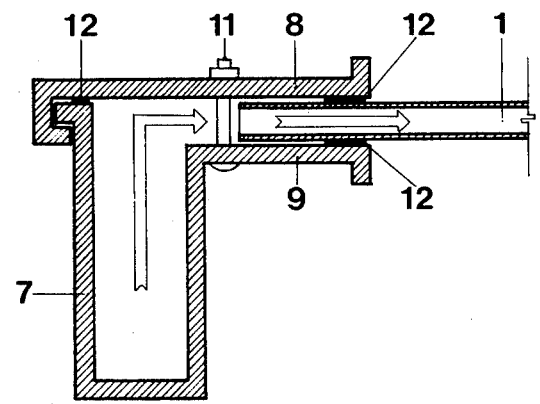

Details of manifolds 5 or 6 are shown in FIG. 3. Referring thereto, each manifold includes two sheet metal components, i.e., open-topped compartment 7 and overlying lid 8. Compartment 7 includes a protruding lip segment 9 adjacent its open top 10. As shown in FIG. 4, when lid 8 overlies compartment 7 and lip 9, then the lid and lip define therebetween the above-mentioned manifold aperture through which ducts 1 extend. Bolt means 11 and sealant 12 (e.g., silicone rubber) are provided to seal the lid and the aperture, and thereby prevent air from escaping the system.

Referring again to FIG. 2, manifolds 5 and 6 are substantially covered with insulation 4a to prevent heat loss; glazing support members 13, nailed to base member 3, surround the heating chamber and manifolds; and a glazing piece 14 is set into the supports 13. The glazing supports may be fabricated of extruded aluminum, and filled with insulation. Other details of such components are shown in my co-pending application Ser. No. 118,904.

The assembled kit is connected to duct work, fans, electrical controls and related apparatus in a manner well known in the solar heating art.

Figure 5:
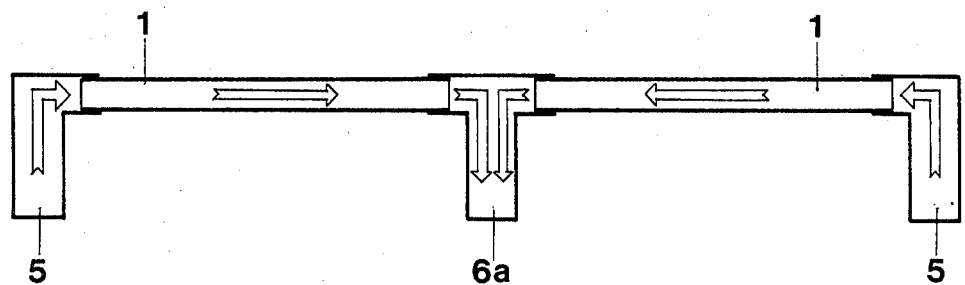
FIG. 5 is a partial view of an alternate embodiment of FIG. 2.

Referring now to FIG. 5, therein is partially shown an alternate embodiment of the assembled kit of FIG. 2. Two manifolds 5 are employed to provide air to two separate sets of ducts 1, while air exits from both sets through a common manifold 6a. As can be seen, manifold 6a has two apertures in its upper sides, one on each side, to accommodate the two sets of ducts. Although not shown in detail, manifold 6a is composed of an open-topped compartment and lid in the manner of FIGS. 3 and 4, except that the compartment includes two lips instead of one, to provide two manifold apertures.

Figure 6:
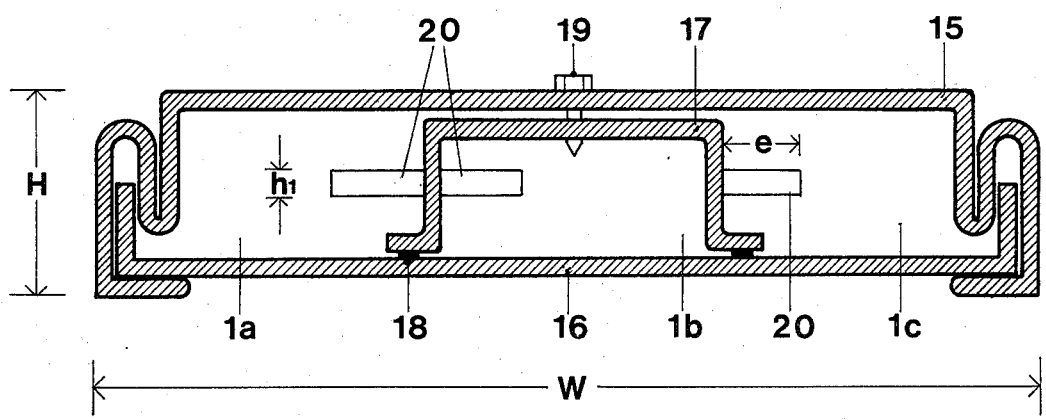
FIG. 6 is a cross-sectional view of the preferred embodiment of the planks of FIGS. 1 and 2.

A preferred duct design is illustrated in transverse cross-section in FIG. 6. As can be seen, the duct is in the shape of a substantially flat rectangle. Each duct is fabricated from two pieces of sheet metal, i.e., upper sheet or wall 15 and lower sheet or wall 16. The sheets are crimped together at their edges in a manner well known in the sheet metal art. The outer surfaces of the sheets. at least upper sheet 15, is painted or otherwise covered or coated in black to aid in absorption of solar energy, as is well known in the solar heating art.

Figure 7:
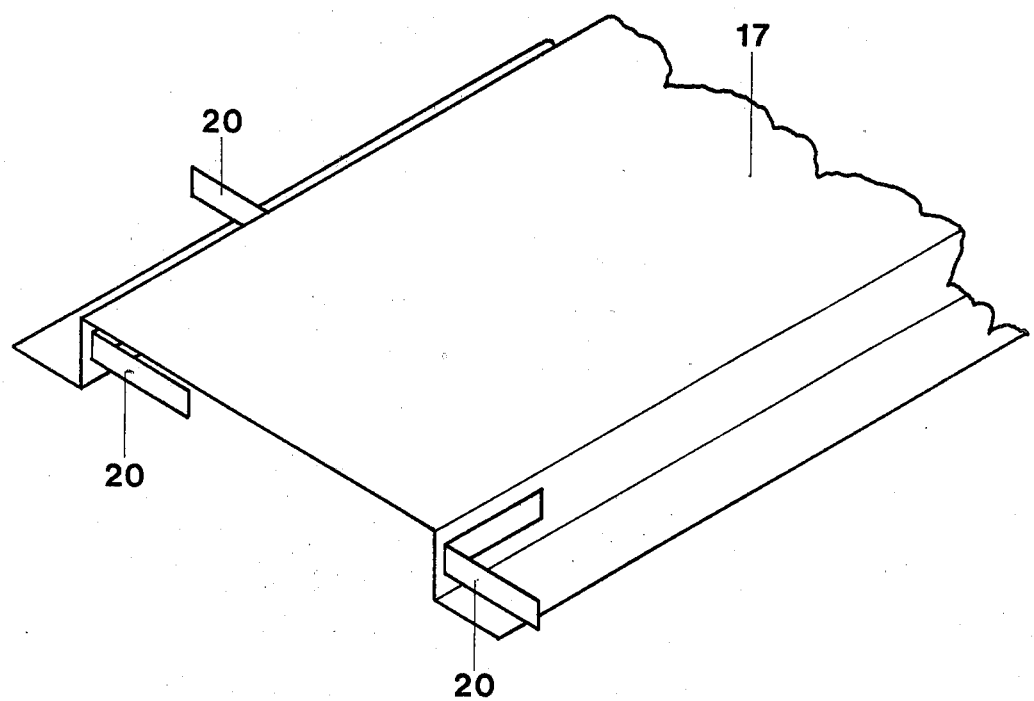
FIG. 7 is a perspective view of the rib of FIG. 6.

Each duct includes an elongated rib member 17, also seen in FIG. 7, disposed within the duct to give structural support thereto. The rib member, which may be attached to the lower wall 16 by spot welds 18 and to the upper wall 15 by sheet metal screws 19, extends essentially the entire length of the plank, down the center. By means of the rib, the duct is divided into three parallel, elongated air channels 1a, 1b, and 1c.

A plurality of fingers or baffles 20 transversely extend into each air channel from the rib to force air to flow through the channels in a serpentine path, to thereby maximize contact between the air and the heated walls of the duct. As shown in FIG. 7, fingers 20 may be an integral part of the rib and may be constructed by partially cutting out pieces of the rib and bending such cut-outs perpendicular to the rib member.

Still referring to FIG. 6, the specific size of the duct may vary, depending upon the heating requirements of the system. A width (W) of 18 inches and a height (H) of ¾ inch will be suitable in many instances. Rib 17 preferably divides the duct into three 6 inch wide channels; and fingers or baffles 20, having a height ($h_1$) of ¼ inch, preferably extend (e) into each channel about 2 inches. There should be a finger in each channel about every 18 inches along the channel to provide sufficient contact between the flowing air and heated walls.

Figure 8:
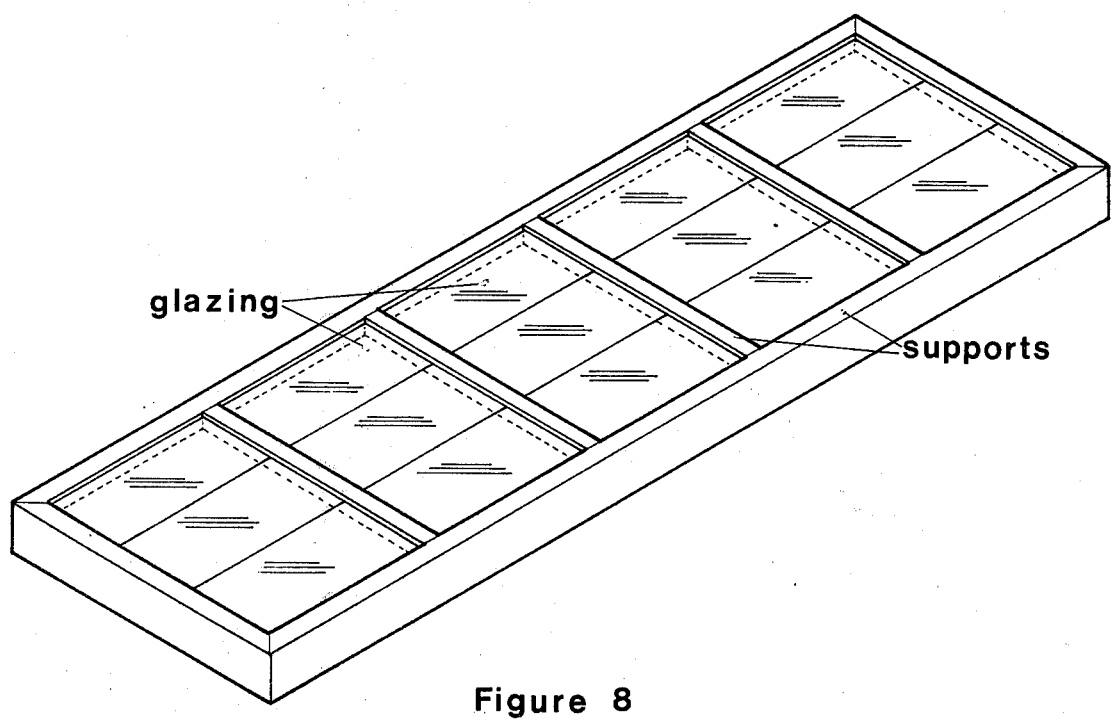
FIG. 8 is a perspective view of the assembled kit.

It is desirable to employ ducts of a length which will accommodate a plurality of standard, uncut tempered glazing panes. For example, a set of three ducts each having a length of approximately 13 feet, six inches, will require 5 panes of standard glazing (⅛×34×76 inches), reference numberal 14, to cover same, as generally illustrated in FIG. 8. It will be obvious to those skilled in the art that in most instances a plurality of sets of ducts will be necessary to supply the heat requirements of the system.

Having thus described my invention, what I claim is:

1. In an apparatus for heating air with solar energy, wherein said air is heated in a chamber disposed below a glazing and surrounded by glazing support structure, the improvement wherein said apparatus comprises a kit capable of on-site assembly upon a planar-shaped base, and wherein said kit includes:

a. at least one prefabricated heating chamber to be placed upon said base, said chamber consisting essentially of a set of elongated, hollow, flat, straight, sheet-metal ducts, which lie flat, side-by-side, above said base when said kit is assembled; wherein each of said ducts is closed except for duct openings at each end thereof; and b. a first manifold chamber separate and distinct from said heating chamber to be disposed at one end of said set of ducts when said kit is assembled; a second manifold chamber separate and distinct from said heating chamber to be disposed at the other end of said set of ducts; wherein said first manifold chamber vertically extends from above said base down through a hole in said base adjacent said one end of said ducts when said kit is assembled; wherein said second manifold chamber vertically extends from above said base down through a hole in said base adjacent said other end of said set of ducts when said kit is assembled; wherein said first manifold chamber includes an aperture in its side through which said set of ducts horizontally extend when kit is assembled; wherein said second manifold chamber includes an aperture in its side through which said set of ducts horizontally extend when said kit is assembled; wherein said first and second manifold chambers each include an open-topped compartment and a lid therefor; wherein said compartment includes a protruding lip segment adjacent its open top; wherein said lid overlies said open top and lip segment when said kit is assembled; wherein said lip and overlying lid define said aperture in said manifolds through which the open ends of said ducts extend when said kit is assembled and wherein said heating chamber and manifolds are detached from said glazing and glazing support when said kit is assembled.

2. The apparatus of claim 1 wherein each of said hollow ducts includes an elongated rib member disposed with said ducts, extending essentially the entire length thereof, down the center of said duct, to give structural support thereto, wherein said rib member divides said hollow duct into parallel, side-by-side, elongated air channels; wherein said rib member includes a plurality of baffles extending transversely into each of said air channels; wherein said baffles are an integral part of said rib member, and are formed by partially cutting out pieces of said rib member and bending same perpendicular to said member.

* * * * *